United States Patent
Agiwal et al.

(10) Patent No.: US 11,985,547 B2
(45) Date of Patent: *May 14, 2024

(54) METHOD AND APPARATUS FOR SUPPORTING FLEXIBLE UE BANDWIDTH IN NEXT GENERATION COMMUNICATION SYSTEM

(71) Applicant: Samsung Electronics Co., Ltd., Suwon-si (KR)

(72) Inventors: Anil Agiwal, Suwon-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,404

(22) Filed: Jan. 3, 2023

(65) Prior Publication Data
US 2023/0144665 A1 May 11, 2023

Related U.S. Application Data

(63) Continuation of application No. 15/668,269, filed on Aug. 3, 2017, now Pat. No. 11,546,802.
(Continued)

(51) Int. Cl.
*H04W 28/20* (2009.01)
*H04W 16/14* (2009.01)
(Continued)

(52) U.S. Cl.
CPC ......... *H04W 28/20* (2013.01); *H04W 16/14* (2013.01); *H04W 74/006* (2013.01);
(Continued)

(58) Field of Classification Search
CPC ... H04W 28/20; H04W 16/14; H04W 74/006; H04W 74/0833; H04W 52/40; H04W 72/02; H04W 74/002; H04B 1/69
See application file for complete search history.

(56) References Cited

U.S. PATENT DOCUMENTS

| 2013/0083749 A1 | 4/2013 | Xu et al. |
| 2013/0083753 A1 | 4/2013 | Lee et al. |

(Continued)

FOREIGN PATENT DOCUMENTS

| CN | 105409136 A | 3/2016 |
| KR | 10-2014-0071482 A | 6/2014 |

(Continued)

OTHER PUBLICATIONS

Chinese Office Action dated May 31, 2023, issued in Chinese Patent Application No. 201780049141.4.
(Continued)

*Primary Examiner* — Charles N Appiah
*Assistant Examiner* — Frank E Donado
(74) *Attorney, Agent, or Firm* — Jefferson IP Law, LLP

(57) ABSTRACT

A method and a system for supporting flexible user equipment (UE) bandwidth by the UE during a random access are provided. The method includes transmitting, to a base station, a random access preamble over a first bandwidth selected among a plurality of channel bandwidths of the UE, receiving, from the base station, a random access response over a second bandwidth selected among the plurality of channel bandwidths, and transmitting, to the base station, a scheduled transmission message over a third bandwidth selected among the plurality of channel bandwidths of the UE.

20 Claims, 12 Drawing Sheets

Related U.S. Application Data

(60) Provisional application No. 62/372,937, filed on Aug. 10, 2016.

(51) Int. Cl.
*H04W 52/40* (2009.01)
*H04W 74/00* (2009.01)
*H04W 74/0833* (2024.01)
*H04B 1/69* (2011.01)

(52) U.S. Cl.
CPC .......... *H04W 74/0833* (2013.01); *H04B 1/69* (2013.01); *H04W 52/40* (2013.01)

(56) References Cited

U.S. PATENT DOCUMENTS

| | | |
|---|---|---|
| 2014/0036820 A1 | 2/2014 | McNamara et al. |
| 2014/0126498 A1 | 5/2014 | Koorapaty et al. |
| 2015/0050898 A1 | 2/2015 | Margalit et al. |
| 2015/0282215 A1 | 10/2015 | Eriksson et al. |
| 2015/0326995 A1* | 11/2015 | Li ........................ H04W 72/51 370/329 |
| 2015/0365976 A1 | 12/2015 | Lee et al. |
| 2016/0029390 A1 | 1/2016 | Ohta et al. |
| 2016/0050667 A1 | 2/2016 | Papasakellariou et al. |
| 2016/0073431 A1* | 3/2016 | Park .................. H04W 72/0473 370/329 |
| 2016/0105908 A1 | 4/2016 | Li et al. |
| 2016/0113040 A1 | 4/2016 | Fan et al. |
| 2016/0135177 A1 | 5/2016 | Ahn et al. |
| 2016/0165640 A1 | 6/2016 | Yang et al. |
| 2016/0219626 A1 | 7/2016 | Martin |
| 2016/0353440 A1 | 12/2016 | Lee et al. |
| 2016/0381712 A1 | 12/2016 | Yang et al. |
| 2017/0048828 A1* | 2/2017 | Um ....................... H04L 1/0061 |
| 2017/0244529 A1 | 8/2017 | Yu et al. |
| 2017/0279646 A1 | 9/2017 | Yi et al. |
| 2017/0280481 A1 | 9/2017 | Stern-Berkowitz et al. |
| 2018/0007543 A1* | 1/2018 | Lee ....................... H04W 72/21 |
| 2018/0132273 A1 | 5/2018 | Zhang et al. |
| 2018/0139668 A1* | 5/2018 | Takahashi ............. H04W 76/14 |
| 2018/0212736 A1 | 7/2018 | Chatterjee et al. |
| 2018/0249509 A1 | 8/2018 | Yi |
| 2018/0255586 A1 | 9/2018 | Einhaus et al. |
| 2018/0279268 A1 | 9/2018 | You et al. |
| 2018/0279373 A1 | 9/2018 | Lee et al. |
| 2019/0104551 A1 | 4/2019 | Deenoo et al. |
| 2019/0124699 A1 | 4/2019 | Yamada et al. |
| 2020/0128585 A1* | 4/2020 | Kuang .................... H04W 8/22 |
| 2020/0314908 A1 | 10/2020 | Hwang et al. |
| 2021/0136823 A1 | 5/2021 | Kim et al. |

FOREIGN PATENT DOCUMENTS

| | | |
|---|---|---|
| WO | 2014/048261 A1 | 4/2014 |
| WO | 2014-068526 A1 | 5/2014 |
| WO | 2015/145400 A1 | 10/2015 |
| WO | 2016-048044 A1 | 3/2016 |
| WO | 2016/072216 A1 | 5/2016 |
| WO | 2016/117981 A1 | 7/2016 |

OTHER PUBLICATIONS

Extended European Search Report dated May 2, 2019, issued in a counterpart European application No. 17839729.5-1215 / 3482599.
Lenovo: "Random Access Procedure for NB-IoT", 3GPP Draft; R1-161009, 3rd Generation Partnership Project (3GPP), Mobile Competence Centre ; 650, Route Des Lucioles ; F-06921 Sophia-Antipolis Cedex ; France vol. RAN WG1, No. XP051064491; Feb. 6, 2016, St Julian's, Malta.
LG Electronics: "Details on RACH procedure for MTC UE",3GPP Draft; R1-156847 PRACH V3, 3rd Generation Partnershit Project (3GPP), Mobile Competence Centre ; 650, Route Des Lucioles ; F-06921 Sophia-Antipolis Cedex ; France, vol. RAN WG1; Nov. 15, 2015, Anaheim, USA.
Indian Office Action dated Jul. 8, 2021, issued in Indian Application No. 201937005012.
European Office Action dated Oct. 6, 2022, issued in a counterpart European Application No. 17 839 729.5.
Intel Corporation: "Remaining details of random access procedures for MTC", 3GPP Draft; R1-156504—Intel MTC RA, 3rd Generation Partnership Project (3GPP), Mobile Competence Centre; 650, Route Des Lucioles ; F-06921 Sophia-Antipolis Cedex ; France vol. RAN WG1, No. XP051002944; Nov. 15, 2015, Anaheim, USA.
Korean Office Action dated Mar. 8, 2021, issued in a counterpart Korean Application No. 10-2019-7003891.

* cited by examiner

METHOD AND APPARATUS FOR SUPPORTING FLEXIBLE UE BANDWIDTH IN NEXT GENERATION COMMUNICATION SYSTEM

CROSS-REFERENCE TO RELATED APPLICATION(S)

This application is a continuation application of prior application Ser. No. 15/668,269, filed on Aug. 3, 2017, which has issued as U.S. Pat. No. 11,546,802 on Jan. 3, 2023, which is based on and claimed the benefit under 35 U.S.C. § 119(e) of a U.S. provisional patent application filed on Aug. 10, 2016, in the U.S. Patent and Trademark Office and assigned Ser. No. 62/372,937, the entire disclosure of which is hereby incorporated by reference.

TECHNICAL FIELD

The present disclosure relates to a wireless communication system. More particularly, the present disclosure relates to an apparatus and a method for supporting flexible user equipment (UE) bandwidth in a wireless communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, and analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from a lack of resources to meet the growing demand for high speed data services. So a fifth generation wireless communication system is being developed to meet the growing demand for high speed data services, support ultra-reliability and low latency applications, and support massive machine type communication.

The above information is presented as background information only to assist with an understanding of the present disclosure. No determination has been made, and no assertion is made, as to whether any of the above might be applicable as prior art with regard to the present disclosure.

SUMMARY

One of the requirements of a next generation system is that it should support flexible network (NW) and user equipment (UE) channel bandwidth (BW). The next generation physical-layer design should allow for fine granularity in terms of next generation (NR) carrier bandwidth. The next generation physical-layer design should be such that devices with different bandwidth capabilities can efficiently access the same NR carrier regardless of the NR carrier bandwidth. The UEs camped on a carrier of certain BW and interested in enhanced mobile broadband may have different channel bandwidths. One of the issues is how to support UEs with different bandwidth capabilities on the same carrier. In the existing system for a given radio access technology (RAT), all UEs camped to a carrier have the same BW as the carrier BW. If the UE does not support same BW as carrier BW then it does not camp on that cell.

Aspects of the present disclosure are to address at least the above-mentioned problems and/or disadvantages and to provide at least the advantages described below. Accordingly, an aspect of the present disclosure is to provide an apparatus and a method for supporting flexible UE bandwidth in a wireless communication system.

Another aspect of the present disclosure is to provide a method for supporting flexible UE bandwidth by a UE during a random access procedure in a wireless communication system, the method comprising transmitting, to a base station, a random access preamble over a first bandwidth selected among a plurality of channel bandwidths of the UE, receiving, from the base station, a random access response over a second bandwidth selected among the plurality of channel bandwidths of the UE in response to the random access preamble, and transmitting, to the base station, a scheduled transmission message over a third bandwidth selected among the plurality of channel bandwidths of the UE.

Another aspect of the present disclosure is to provide a method for supporting flexible user UE bandwidth by a base station during a random access procedure in a wireless communication system, the method comprising receiving, from the UE, a random access preamble over a first bandwidth selected among a plurality of channel bandwidths of the UE, transmitting, to the UE, a random access response over a second bandwidth selected among the plurality of channel bandwidths of the UE in response to the random access preamble, and receiving, from the UE, a scheduled transmission message over a third bandwidth selected among the plurality of channel bandwidths of the UE.

Another aspect of the present disclosure is to provide a UE for supporting flexible UE bandwidth during a random access procedure in a wireless communication system. The UE includes a transceiver configured to transmit and receive signals, and at least one processor coupled with the transceiver and configured to transmit, to a base station, a random access preamble over a first bandwidth selected among a plurality of channel bandwidths of the UE, receive, from the base station, a random access response over a second bandwidth selected among the plurality of channel bandwidths of the UE in response to the random access preamble, and transmit, to the base station, a scheduled transmission message over a third bandwidth selected among the plurality of channel bandwidths of the UE.

Another aspect of the present disclosure is to provide a base station for supporting flexible UE bandwidth during a random access procedure in a wireless communication system. The base station includes a transceiver configured to transmit and receive signals, and at least one processor coupled with the transceiver and configured to receive, from the UE, a random access preamble over a first bandwidth selected among a plurality of channel bandwidths of the UE, transmit, to the UE, a random access response over a second bandwidth selected among the plurality of channel bandwidths of the UE in response to the random access preamble, and receive, from the UE, a scheduled transmission message over a third bandwidth selected among the plurality of channel bandwidths of the UE.

In accordance with an aspect of the present disclosure, a method to support UEs with different bandwidth capabilities on a same carrier during a random access procedure is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
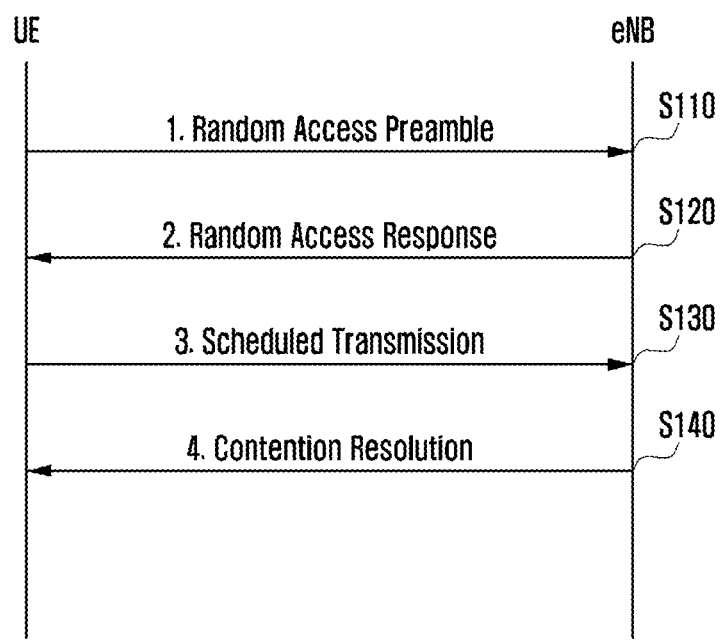
FIG. 1 illustrates a contention-based random access (CBRA) procedure according to an embodiment of the present disclosure.

FIG. 1 illustrates a contention-based random access (CBRA) procedure according to an embodiment of the present disclosure.

Referring to FIG. 1, in operation 110, a user equipment (UE) transmits a random access (RA) preamble to a base station evolved NodeB (eNB). The UE selects one of the available 64-Ncf contention based RA preambles. Ncf is the number of RA preambles reserved for contention free access.

The contention based RA preambles can be optionally partitioned into two groups. If two groups are configured, the UE selects the group based on size of a scheduled transmission (message 3) it can transmit. The initial RA preamble transmission power is set based on open loop estimation after compensating for path loss.

In operation 120, the eNB transmits a random access response (RAR) to the UE in response to the RA preamble. The eNB transmits the RAR on physical downlink shared channel (PDSCH) addressed to an RA-radio network temporary identifier (RA-RNTI). RA-RNTI identifies the time-frequency slot in which RA preamble was detected by the eNB. RAR conveys RA preamble identifier, timing alignment information, temporary cell radio network temporary identifier (C-RNTI) and uplink (UL) grant for message 3. RAR may also include a back off indicator to instruct the UE to back off for a period of time before retrying an RA attempt. RAR is transmitted in an RAR window.

In operation 130, the UE transmits scheduled UL transmission to the eNB in response to the RAR. The UE transmits scheduled UL transmission on physical uplink shared channel (PUSCH). It is used to transmit message, such as radio resource control (RRC) connection request, RRC connection re-establishment request, RRC handover confirm, scheduling request, and the like. It also includes the UE identity (i.e., C-RNTI or SAE-temporary mobile subscriber identity (S-TMSI) or a random number). Hybrid automatic-repeat-request (HARQ) is used for this transmission. This is commonly referred as message 3 (MSG3).

In operation 140, the eNB transmits a contention resolution message to the UE. It uses HARQ and is addressed to C-RNTI (if included in message 3) or temporary C-RNTI (UE identity included in message 3 is included this case). On successful decoding of this message, HARQ feedback is only sent by the UE which detects its own UE ID (or C-RNTI).

Figure 2:
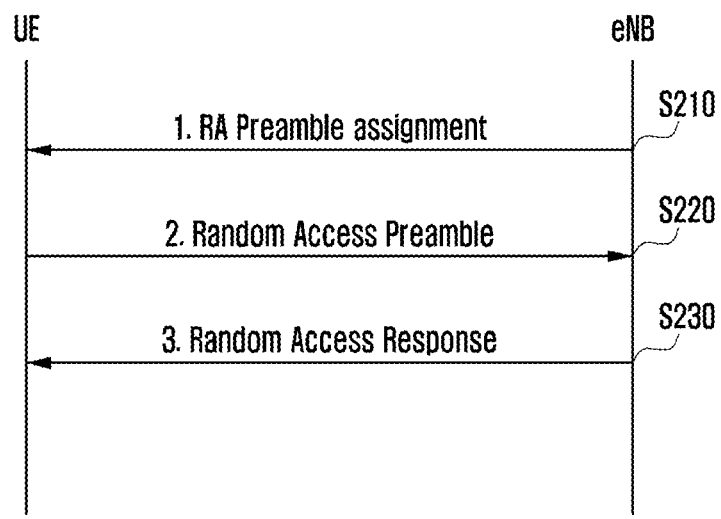
FIG. 2 illustrates a contention-free random access (CFRA) procedure according to an embodiment of the present disclosure.

FIG. 2 illustrates a contention-free random access (CFRA) procedure according to an embodiment of the present disclosure.

Contention free RA procedure is used for scenarios, such as handover where low latency is required, timing advance establishment for a secondary cell (SCell), and the like.

Referring to FIG. 2, in operation 210, the eNB assigns to the UE non-contention RA preamble in dedicated signaling. In operation 220, the UE transmits the assigned non-contention RA preamble to the eNB.

In operation 230, the eNB transmits RAR on PDSCH addressed to RA-RNTI. RAR conveys RA preamble identifier and Timing alignment information. RAR may also include UL grant. RAR is transmitted in RAR window similar to contention based RA procedure. Contention free RA procedure terminates after receiving the RAR.

Figure 3:
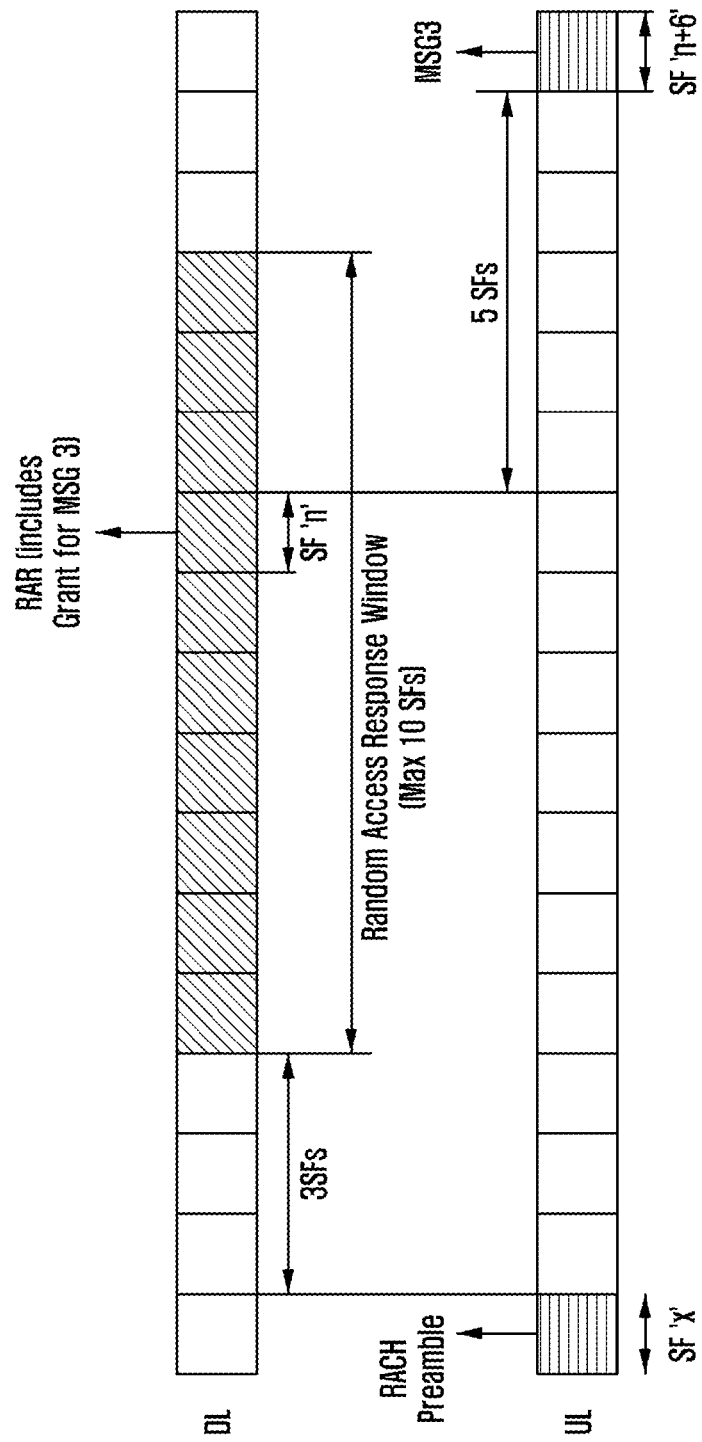
FIG. 3 illustrates signal timing between a user equipment (UE) and a base station in a random access procedure according to an embodiment of the present disclosure.

FIG. 3 illustrates signal timing between a UE and a base station in a random access procedure according to an embodiment of the present disclosure.

Referring to FIG. 3, the UE transmits RA preamble (or a random access channel (RACH) preamble) to the eNB at subframe (SF) 'x'. The eNB transmits RAR including grant for MSG3 to the UE at subframe 'n'. RAR is transmitted in a RAR window. As shown in FIG. 3, RAR window starts at subframe 'x+3' for RA preamble transmitted in subframe 'x'. RAR window size is configurable (for example, 10 SFs). Thereafter, the UE transmits MSG 3 to the eNB at subframe 'n+6' for RAR transmitted in subframe 'n'.

In new radio (NR), CBRA procedure is needed at least for initial access. During initial access dedicated RA preamble assignment is not possible. In addition to the CBRA procedure, CFRA should also be supported for scenarios, such as handover, scheduling request transmission, and the like, where low latency is required.

One of the requirements of a next generation system is that it should support flexible NW and UE channel bandwidth. The next generation physical-layer design should allow for fine granularity in terms of NR carrier bandwidth. The next generation physical-layer design should be such that devices with different bandwidth capabilities can efficiently access the same NR carrier regardless of the NR carrier bandwidth.

The UEs camped on a carrier of certain bandwidth (BW) and interested in enhanced mobile broadband may have different channel bandwidths. One of the issues is how to support UEs with different bandwidth capabilities on the same carrier. In the existing system for a given radio access technology (RAT), all UEs camped to a carrier have the same BW as the carrier BW. If the UE does not support the same BW as the carrier BW then it does not camp on that cell.

A method to support UEs with different bandwidth capabilities on the same NR carrier during a random access procedure is needed.

Figure 4:
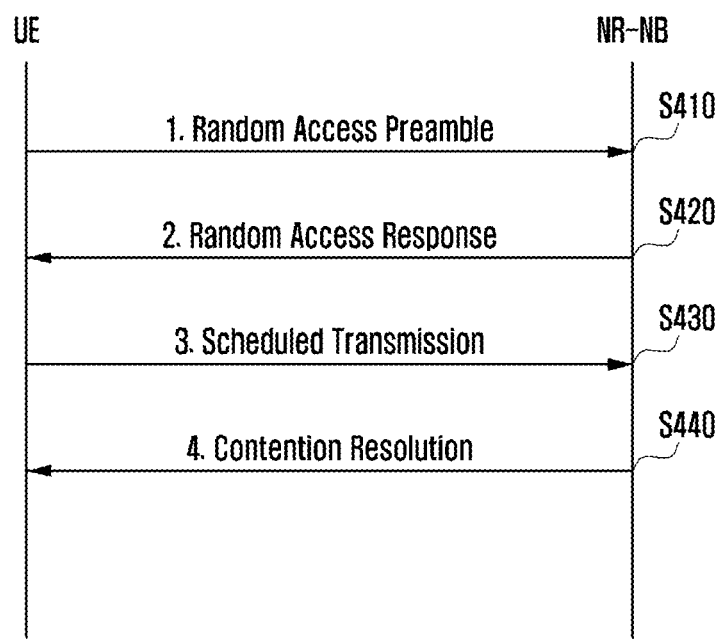
FIG. 4 illustrates a CBRA procedure in next generation (NR) according to an embodiment of the present disclosure.

FIG. 4 illustrates a CBRA procedure in a next generation NR according to an embodiment of the present disclosure.

The high level operation for contention based RA procedure in NR are shown in FIG. 4.

There is a need to identify what is required to support UEs with different channel bandwidth capabilities on the same NR carrier during each operation of RA procedure.

Referring to FIG. 4, in operation 410, a UE transmits a RA preamble to a base station (NR-NB). The channel bandwidth of a UE transmitting the RA preamble can be smaller than the NR carrier bandwidth. Also different UEs may have different channel bandwidth for transmission/reception on the same NR carrier.

In order to support UEs with different channel bandwidth capabilities on the same NR carrier, physical random access channel (PRACH) bandwidth in NR should be less than or equal to minimum supported UE channel bandwidth in NR. This ensures that every UE is able to transmit RA preamble irrespective of its supported channel bandwidth during initial access. For example, if B1, B2, and B3 are various UE channel bandwidths supported in system such that B1>B2>B3, then PRACH bandwidth should be less than or equal to B3.

In operation 420, the NR-NB transmits a RAR to the UE in response to the RA preamble. NR-NB transmits RAR in response to successfully received RA preamble. NR-NB transmits new radio-physical downlink control channel (NR-PDCCH) (similar to a long term evolution (LTE) PDCCH) addressed to RA-RNTI to indicate RAR transmitted in NR-PDSCH (similar to LTE PDSCH).

The receiving (RX) channel bandwidth of a UE waiting for RAR after transmitting the RA preamble can be smaller than the NR carrier bandwidth. UE can monitor the NR-PDCCH for RAR during the RAR window only over the RX channel bandwidth supported by it. UE can also receive the RAR only over the RX channel bandwidth supported by it. So, the NR-PDCCH for RAR and RAR should be transmitted by NR-NB over bandwidth less than or equal to RX channel bandwidth of the UE.

In operation 430, the UE transmits scheduled UL transmission (MSG3) to the NR-NB in response to the RAR. The resources for initial transmission of MSG3 are provided in RAR. Resources for retransmission of MSG3 are indicated using NR-PDCCH. The TX and RX channel bandwidth of a UE can be smaller than the NR carrier bandwidth. So, the NR-PDCCH for MSG3 retransmission should be transmitted by NR-NB over bandwidth less than or equal to RX channel bandwidth of the UE. Resources for MSG3 transmission should be allocated to the UE over a bandwidth less than or equal to a transmit (TX) channel bandwidth of a UE.

In operation 440, the NR-NB transmits a contention resolution message (MSG4) to the UE. NR-NB similar to LTE transmits the MSG4 in response to successfully received MSG3. Resources for (re-)transmissions of MSG4 are indicated using NR-PDCCH. The TX and RX channel bandwidth of a UE can be smaller than the NR carrier bandwidth. So, the NR-PDCCH for MSG4 (re-)transmissions should be transmitted by NR-NB over bandwidth less than or equal to RX channel bandwidth of the UE. Resources for MSG4 transmission should be allocated to the UE over bandwidth less than or equal to TX channel bandwidth of the UE.

In this method frequency resources (or bandwidth part/sub-band wherein the carrier bandwidth is divided into multiple bandwidth parts/sub-bands in frequency domain) corresponding to minimum supported UE channel bandwidth in system for transmitting and receiving PRACH, NR-PDCCH, RAR, MSG3 and MSG 4 is signaled in broadcast signaling. For example, if B1, B2 and B3 are various UE channel bandwidths supported in system such that B1>B2>B3 then minimum supported UE channel bandwidth in system is equal to B3. If the TX and RX minimum supported UE channel BW in system are different then frequency resources (or bandwidth part/sub-band) corresponding to minimum supported UE TX channel bandwidth and frequency resources (or bandwidth part/sub-band) corresponding to minimum supported UE RX channel bandwidth is indicated independently.

In an embodiment these frequency resources (or bandwidth part/sub-band) is indicated in master information base (MIB) in broadcast channel (BCH) or system information block (SIB). In another embodiment of the present disclosure, the frequency resources (or bandwidth part/sub-band) can be same as the frequency resources (or bandwidth part/sub-band) in which BCH is received or at an offset from frequency resources (or bandwidth part/sub-band) in which BCH is received. The offset can be signaled in MIB of BCH. UE receives the NR-PDCCH, RAR and MSG4 over the RX frequency resources (or bandwidth part/sub-band) in time intervals for receiving NR-PDCCH, RAR and MSG4. UE transmits the RA preamble and MSG3 over the TX frequency resources (or bandwidth part/sub-band) in time intervals for RA preamble and MSG3 transmissions.

In order to indicate the frequency resources (or bandwidth part/sub-band), in an embodiment of the present disclosure, NR carrier BW can be divided in frequency domain in several sub-bands or bandwidth parts wherein BW of each sub-band or bandwidth part is less than or equal to minimum supported UE channel bandwidth in system. These sub-bands or bandwidth parts can be logically numbered and sub-band number or bandwidth part number for transmitting and receiving PRACH, NR-PDCCH, RAR, MSG3 and MSG4 is indicated in broadcast signaling. If the TX and RX minimum supported UE channel BW in system are different then both TX sub-band number or TX bandwidth part number and RX sub-band number or RX bandwidth part number are indicated independently.

This approach is simple. However it limits the number of concurrent random accesses.

Figure 5:
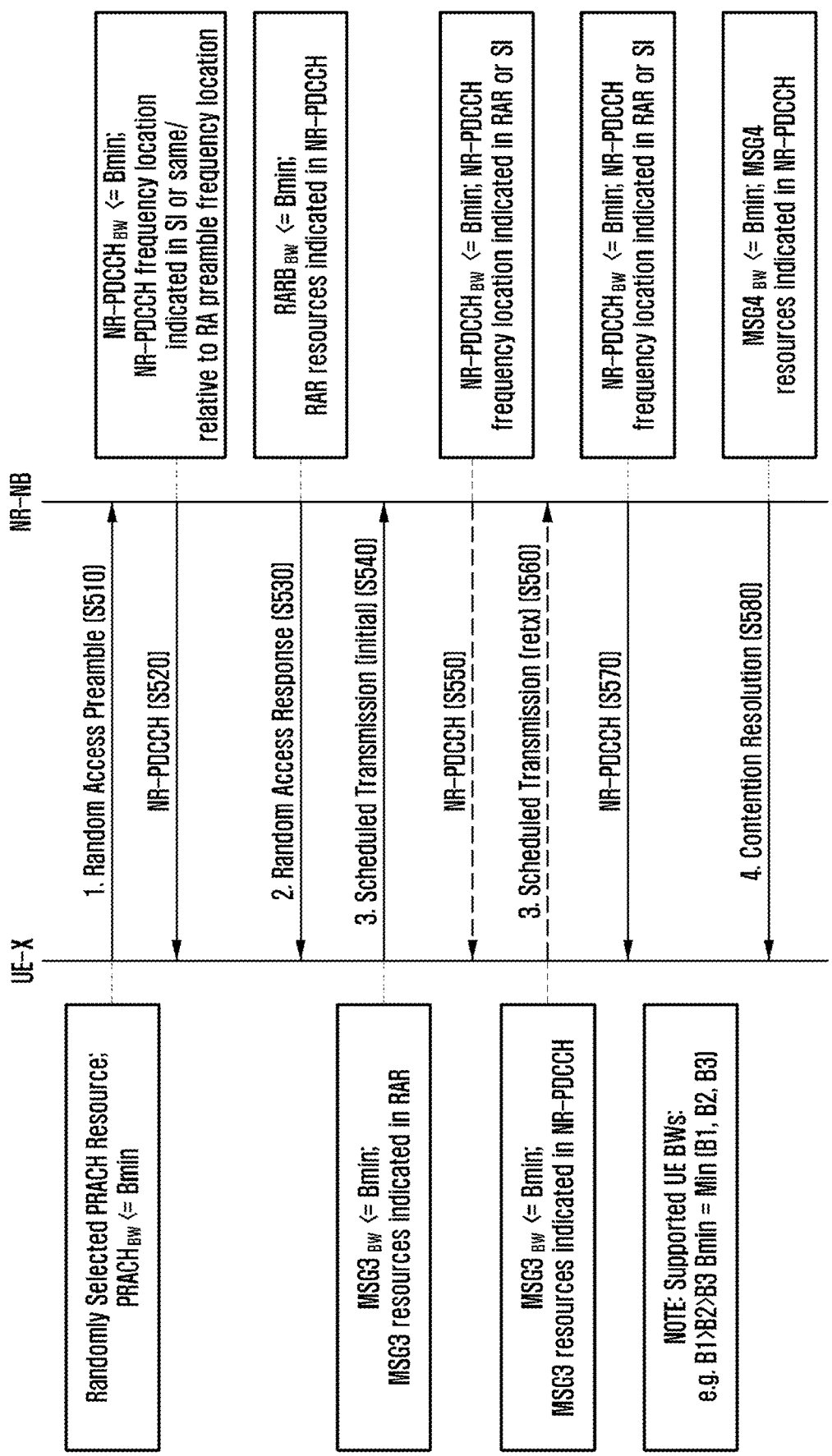
FIG. 5 illustrates a method for supporting UEs with different bandwidth in a CBRA procedure according to an embodiment of the present disclosure.

FIG. 5 illustrates a method for supporting UEs with different bandwidth in a CBRA procedure according to an embodiment of the present disclosure.

Referring to FIG. 5, in operation 510, a user equipment (UE-X) transmits a RA preamble to a base station (NR-NB). The UE transmits the RA preamble over a PRACH resource. PRACH bandwidth is less than or equal to minimum supported UE TX channel bandwidth in the system. For example, if B1, B2 and B3 are various UE TX channel bandwidths supported in system such that B1>B2>B3 then minimum supported UE TX channel bandwidth in system is equal to B3.

NR-NB does not know the supported channel bandwidth of UE-X from which it has received the RA preamble. In operation 520 and 530, NR-PDCCH for RAR and RAR is transmitted by NR-NB over bandwidth less than or equal to minimum supported UE RX channel bandwidth in the system. For example, if B1, B2 and B3 are various UE RX channel bandwidths supported in system such that B1>B2>B3 then NR-PDCCH for RAR and RAR is transmitted by NR-NB over bandwidth ≤Bmin=B3. UE monitors NR-PDCCH for RAR and RAR over minimum supported UE RX channel bandwidth in the system.

There can be several locations in frequency domain to monitor NR-PDCCH for RAR over minimum supported UE RX bandwidth. On a NR carrier, the location of frequency resources or bandwidth part/sub-band (identified by bandwidth part/sub-band number/index) for monitoring NR-PDCCH for RAR wherein the bandwidth of frequency resources or bandwidth part/sub-band is equal to minimum supported UE RX channel bandwidth can be signaled in system information (e.g., MIB or SIB). Alternately, the location of frequency resources or bandwidth part/sub-band for monitoring NR-PDCCH for RAR can be same as or relative to the location of frequency resources or bandwidth part/sub-band in which RA preamble is transmitted. Alternately, the location of frequency resources or bandwidth part/sub-band for monitoring NR-PDCCH for RAR can be same as or relative to the location of frequency resources or bandwidth part/sub-band in which MIB or broadcast information is received.

RAR frequency resources and/or bandwidth part/sub-band (identified by bandwidth part/sub-band number/index) for receiving RAR wherein the bandwidth of frequency resources or bandwidth part/sub-band is equal to minimum supported UE RX channel bandwidth is indicated in NR-PDCCH.

In operation 540, the UE-X transmits Scheduled UL transmission (or MSG3) to the NR-NB. The NR-NB does not know the supported TX channel bandwidth of the UE. So for MSG3 transmission, NR-NB allocates frequency resources in RAR, corresponding to less than or equal to minimum supported UE TX channel bandwidth. In operation 560, for MSG3 retransmissions, the UE needs to monitor NR-PDCCH. The frequency resources or bandwidth part/sub-band for monitoring NR-PDCCH for MSG3 are indicated in RAR wherein the bandwidth of frequency resources or bandwidth part/sub-band is equal to minimum supported UE RX channel bandwidth in system. Alternately, in operation 570, the location of frequency resources or bandwidth part/sub-band for monitoring NR-PDCCH for MSG3 corresponding to minimum supported UE TX channel bandwidth in system can be signaled in system information. MSG3 retransmission frequency resources and/or bandwidth part/sub-band corresponding to minimum supported UE TX channel bandwidth in system is indicated in NR-PDCCH.

In operation 580, the NR-NB transmits contention resolution message (or MSG4) to the UE-X. For receiving MSG4 (re-)transmissions, the UE needs to monitor NR-PDCCH. The frequency resources or bandwidth part/sub-band for monitoring NR-PDCCH can be indicated in RAR wherein the bandwidth of frequency resources or bandwidth part/sub-band is equal to minimum supported UE RX channel bandwidth in system. Alternately, the location of frequency resources or bandwidth part/sub-band for monitoring NR-PDCCH for MSG4 corresponding to minimum supported UE RX channel bandwidth can be signaled in system information. The frequency resources and/or bandwidth part/sub-band for MSG4 (re-)transmission can be indicated in NR-PDCCH according to minimum supported UE RX channel bandwidth.

According to an embodiment of the present disclosure, the UE can report its supported RX channel bandwidth in MSG3. The frequency resources and/or bandwidth part/sub-band (identified by bandwidth part/sub-band number/index) for MSG4 (re-)transmission can be indicated in NR-PDCCH according to supported RX channel bandwidth of the UE.

The location of frequency resources or bandwidth part/sub-band (identified by bandwidth part/sub-band number/index) for monitoring NR-PDCCH for MSG4 corresponding to each supported UE channel bandwidth can be signaled in system information or RAR. So UE can monitor NR-PDCCH for MSG4 over its supported RX channel bandwidth. NR-NB transmits NR-PDCCH for MSG4 in the frequency resources or bandwidth part/sub-band corresponding to UEs supported RX channel bandwidth.

In an embodiment TX and RX channel BW of the UE can be same and can be referred as channel BW of the UE. In another embodiment of the present disclosure, TX and RX channel BW of the UE can be different and minimum of TX and RX channel BW of the UE can referred as channel BW of the UE in above operation.

Figure 6:
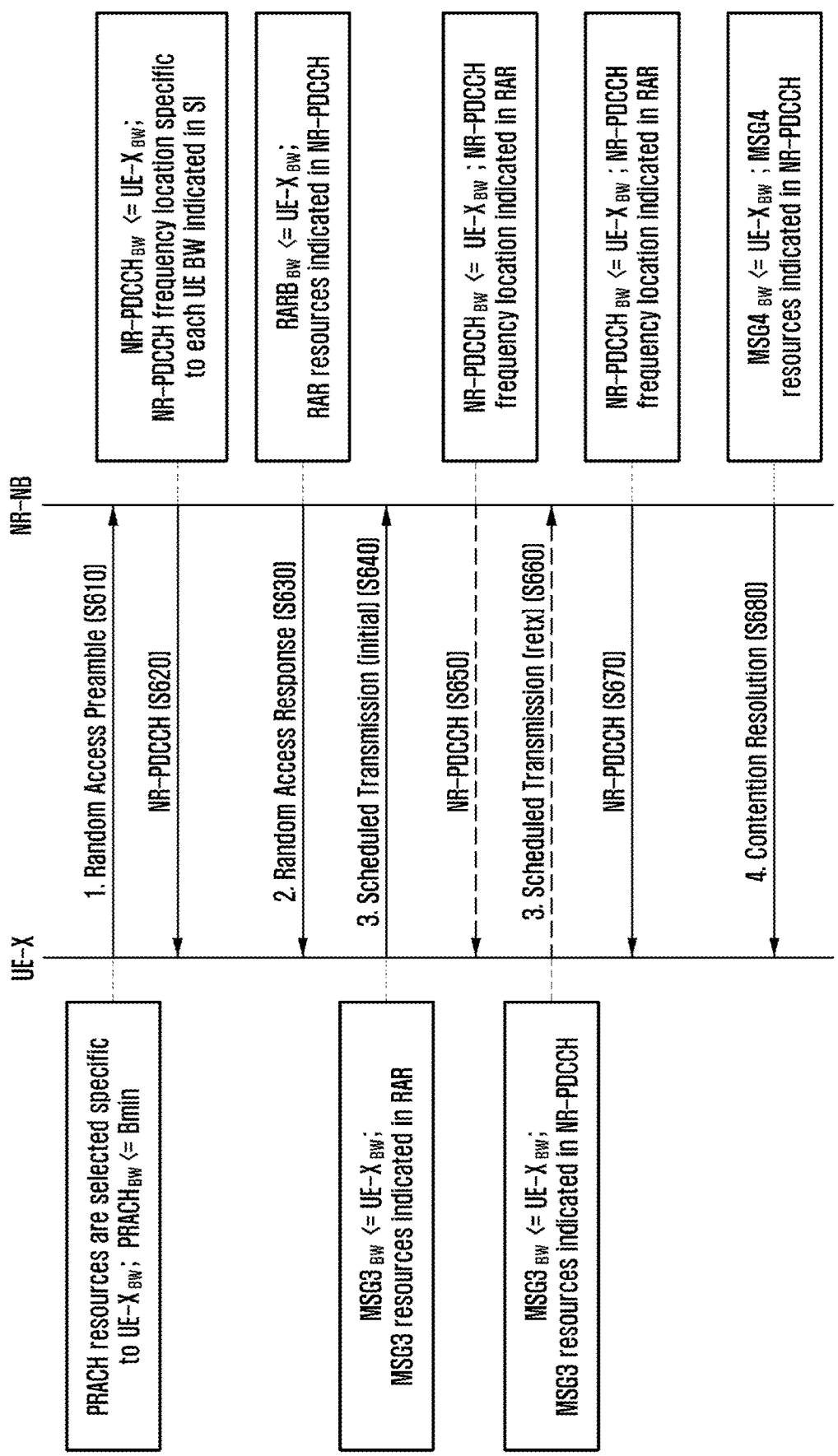
FIG. 6 illustrates a method for supporting UEs with different bandwidth in a CBRA procedure according to another embodiment of the present disclosure.

FIG. 6 illustrates a method for supporting UEs with different bandwidth in a CBRA procedure according to an embodiment of the present disclosure.

Referring to FIG. 6, in operation 610, the UE transmits the RA preamble over a PRACH resource. The RA preamble(s) and/or time and/or frequency resources for RA preamble transmission corresponding to each supported UE channel bandwidth is signaled in system information. UE selects the RA preamble and/or time and/or frequency resource for RA preamble transmission according to a channel bandwidth supported by it. NR-NB can know the channel bandwidth supported by the UE on receiving the RA preamble transmission.

In operation 620, NR-PDCCH for RAR is transmitted over channel bandwidth less than or equal to a channel bandwidth supported by the UE. For example, if B1, B2, and B3 are various UE bandwidths supported in system such that B1>B2>B3, Bc is carrier bandwidth, UE1 which has transmitted RA preamble has channel bandwidth B2, then, in operation 630, NR-PDCCH for RAR and RAR is transmitted by NR-NB over channel bandwidth less than or equal to B2. UE monitors NR-PDCCH for RAR and RAR over its supported UE channel bandwidth.

There can be several locations in frequency domain to transmit/receive NR-PDCCH for RAR over supported UE channel bandwidth. The location of frequency resources or one or more bandwidth parts/sub-bands for receiving NR-PDCCH for RAR corresponding to each supported UE channel bandwidth can be signaled in system information. The bandwidth of each bandwidth part or sub band can be minimum supported UE channel bandwidth. For each supported UE channel bandwidth one or more bandwidth part or sub bands can be indicated.

RAR frequency resources over supported UE channel bandwidth is indicated in NR-PDCCH.

In operation 640, the UE transmits scheduled UL transmission (or MSG3) to the NR-NB. In this approach NR-NB knows the UE supported channel bandwidth. So it allocates frequency resources corresponding to UE's channel bandwidth in RAR. In operations 650 and 660, for MSG3 retransmissions, the UE needs to monitor NR-PDCCH. In operation 670, the frequency resources or one or more bandwidth parts/sub-bands for monitoring NR-PDCCH are also indicated in RAR according to the UE supported channel bandwidth. The frequency resources for MSG3 retransmission are indicated in NR-PDCCH according to the UE supported channel bandwidth.

In operation 680, the NR-NB transmits contention resolution message (or MSG4) to the UE. For receiving MSG4 (re-)transmissions, the UE need to monitor NR-PDCCH. The frequency resources or one or more bandwidth parts/sub-bands for monitoring NR-PDCCH are indicated in RAR according to the UE supported channel bandwidth. The frequency resources for MSG4 (re-)transmission are indicated in NR-PDCCH according to the UE supported channel bandwidth.

In an embodiment TX and RX channel BW of the UE can be same and can be referred as channel BW of the UE. In another embodiment of the present disclosure, TX and RX channel BW of the UE can be different and minimum of TX and RX channel BW of the UE can referred as channel BW of the UE in above operation.

a) RA Preamble: UE transmits the RA preamble over a PRACH resource. The RA preamble(s) and/or time and/or frequency resources for RA preamble transmission corresponding to each supported UE channel bandwidth is signaled in system information. UE selects the RA preamble and/or time and/or frequency resource for RA preamble transmission according to RX channel bandwidth supported by it. NR-NB can know the RX channel bandwidth supported by the UE on receiving the RA preamble transmission.

b) Random Access Response: NR-PDCCH for RAR is transmitted over channel bandwidth less than or equal to RX channel bandwidth supported by the UE. For example, if B1, B2, and B3 are various UE RX bandwidths supported in system such that B1>B2>B3, Bc is carrier bandwidth, UE1 which has transmitted RA preamble has channel bandwidth B2, then NR-PDCCH for RAR and RAR is transmitted by NR-NB over channel bandwidth less than or equal to B2. UE monitors NR-PDCCH for RAR and RAR over its supported UE RX channel bandwidth.

There can be several locations in frequency domain to transmit/receive NR-PDCCH for RAR over supported UE RX channel bandwidth. The location of frequency resources or one or more bandwidth parts/sub-bands for receiving NR-PDCCH for RAR corresponding to each supported UE RX channel bandwidth can be signaled in system information.

RAR resources over supported UE channel bandwidth is indicated in NR-PDCCH.

c) Scheduled UL Transmission or MSG3: In this approach NR-NB does not know the UE supported TX channel bandwidth. So it allocates resources corresponding to minimum supported UE channel bandwidth in RAR. For MSG3 retransmissions, the UE needs to monitor NR-PDCCH. The frequency resources or one or more bandwidth parts/sub-bands for monitoring NR-PDCCH are also indicated in RAR according to the UE supported RX channel bandwidth. The frequency resources for MSG3 retransmission are indicated in NR-PDCCH according to minimum supported channel bandwidth.

d) Contention Resolution Message or MSG4: For receiving MSG4 (re-)transmissions, the UE need to monitor NR-PDCCH. The frequency resources or one or more bandwidth parts/sub-bands for monitoring NR-PDCCH are indicated in RAR according to the UE supported channel bandwidth. The frequency resources for MSG4 (re-)transmission are indicated in NR-PDCCH according to the UE supported channel bandwidth.

Figure 7:
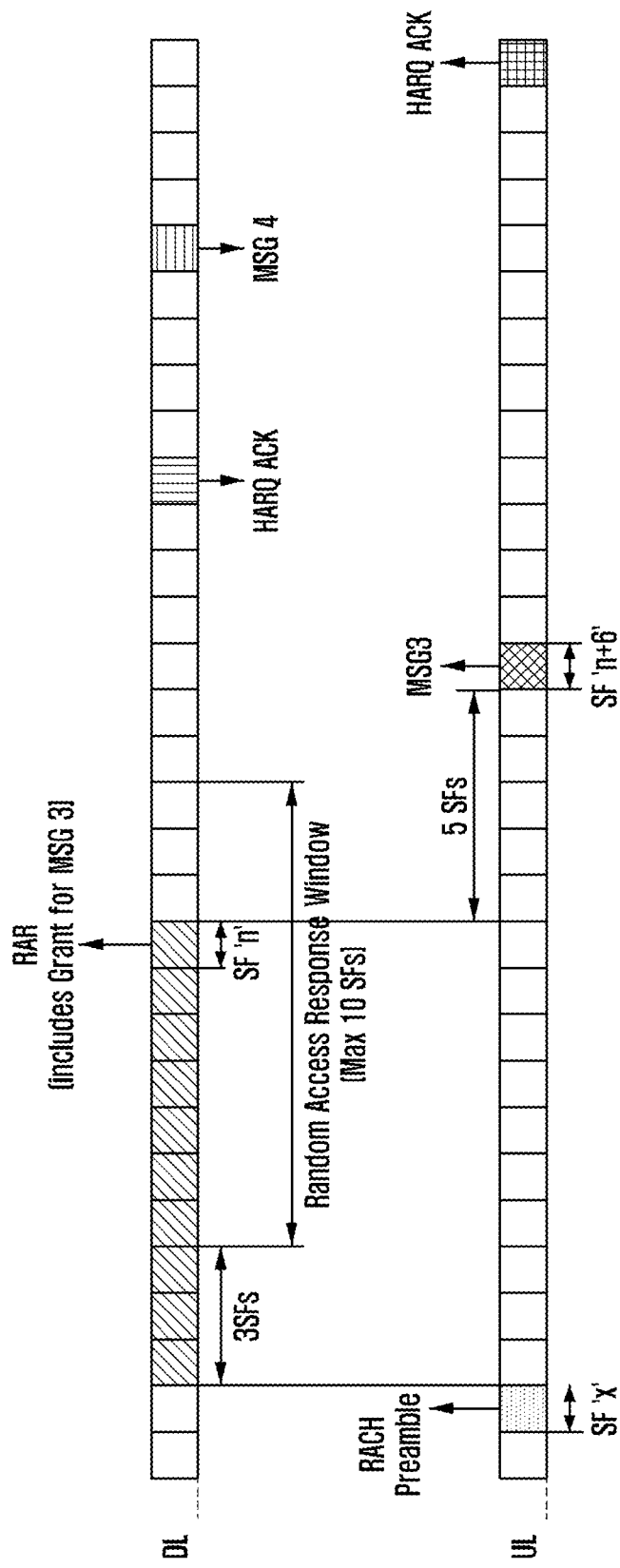
FIG. 7 illustrates a timeline for beam feedback using a random access procedure according to an embodiment of the present disclosure.

FIG. 7 illustrates a timeline for beam feedback using a random access procedure according to an embodiment of the present disclosure.

Referring to FIG. 7, beam feedback is sent in MSG3. Beam change command with beam ID is received in MSG4. Beam change is applied N subframes after HARQ ACK for MSG4.

Figure 8:
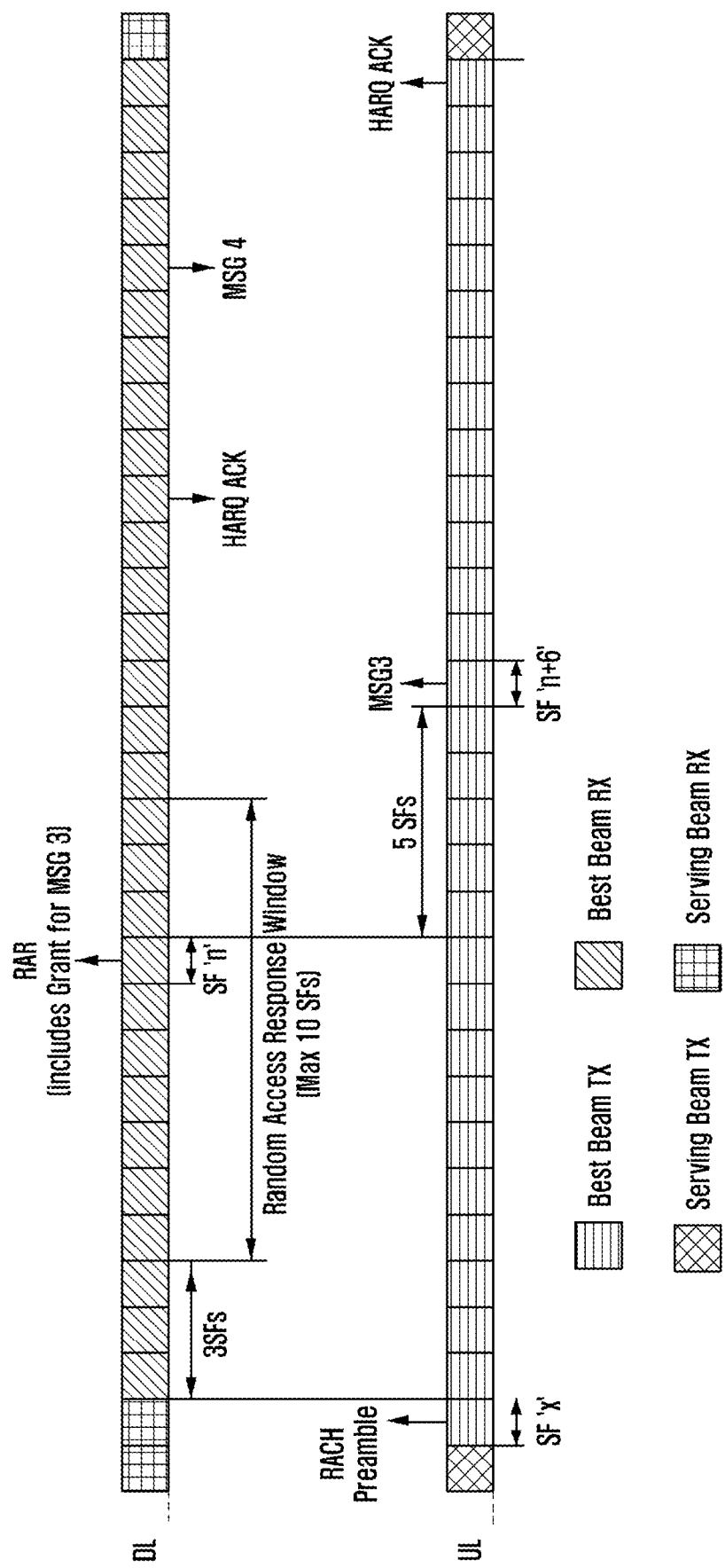
FIG. 8 illustrates beam usage during a random access procedure according to an embodiment of the present disclosure.

FIG. 8 illustrates beam usage during a random access procedure according to an embodiment of the present disclosure.

Referring to FIG. 8, beam Usage during RA procedure is shown in FIG. 8. During RA procedure best or suitable TX/RX beam are used by the UE which can be different from serving TX/RX beam used for uplink/downlink (UL/DL) data TX/RX. The issue is that UE misses UL and DL data during a random access procedure as UL/DL data is TX/RX based on serving TX/RX beam.

Figure 9:
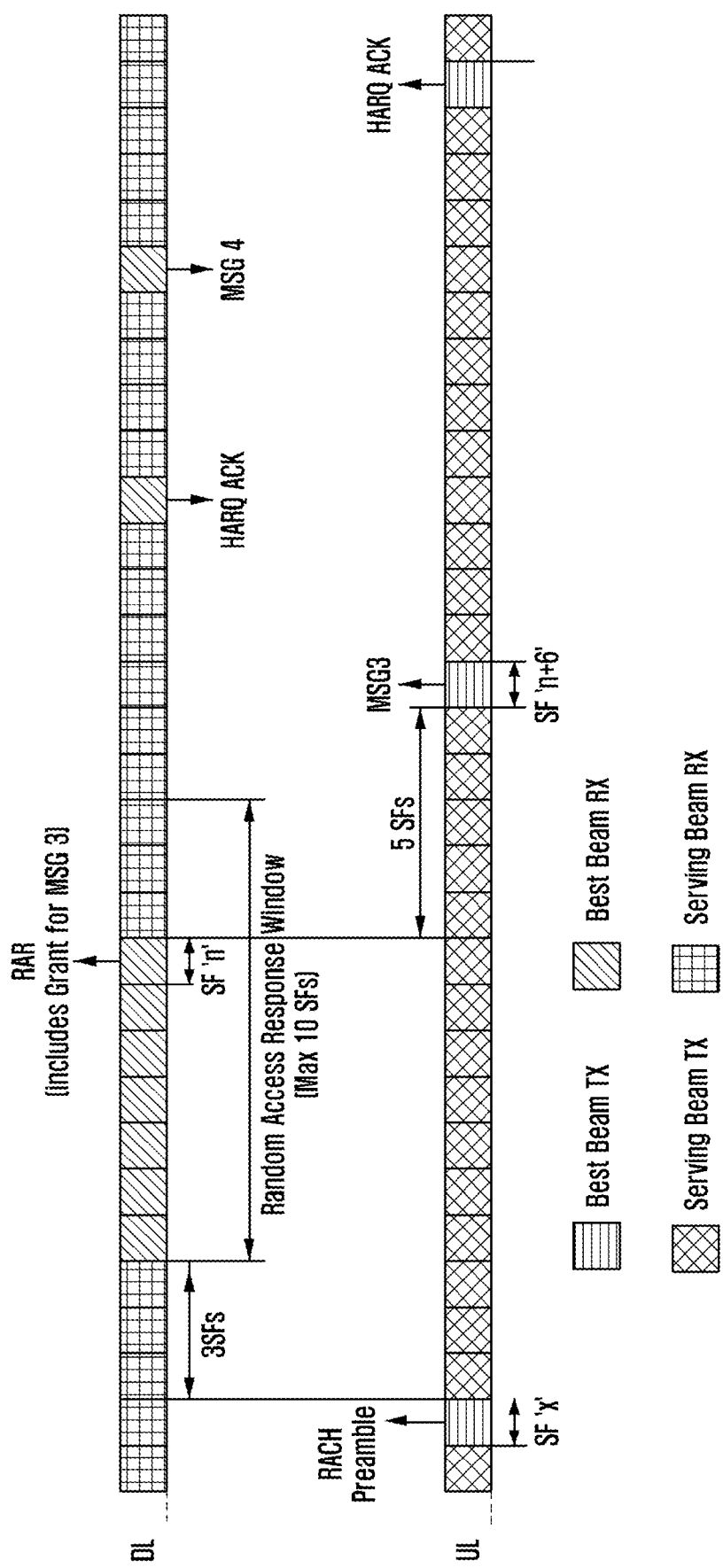
FIG. 9 illustrates beam usage during a random access procedure according to an embodiment of the present disclosure.

FIG. 9 illustrates beam usage during a random access procedure according to an embodiment of the present disclosure.

Referring to FIG. 9, in a method of proposed disclosure the modified beam usage during a random access procedure for beam feedback is illustrated in FIG. 9. Best/suitable TX beam for RA is used in SF (or time slot) where RACH Preamble, MSG3, HARQ feedback for MSG4 are transmitted. Best/suitable RX beam for RA is used from start of RAR window until UE receives RAR. Best/suitable RX beam is used in SF(s) (or time slots) where HARQ feedback for MSG3 and MSG4 are received or likely to be received. In other SFs (or time slots) UE uses serving TX/RX beam.

Figure 10:
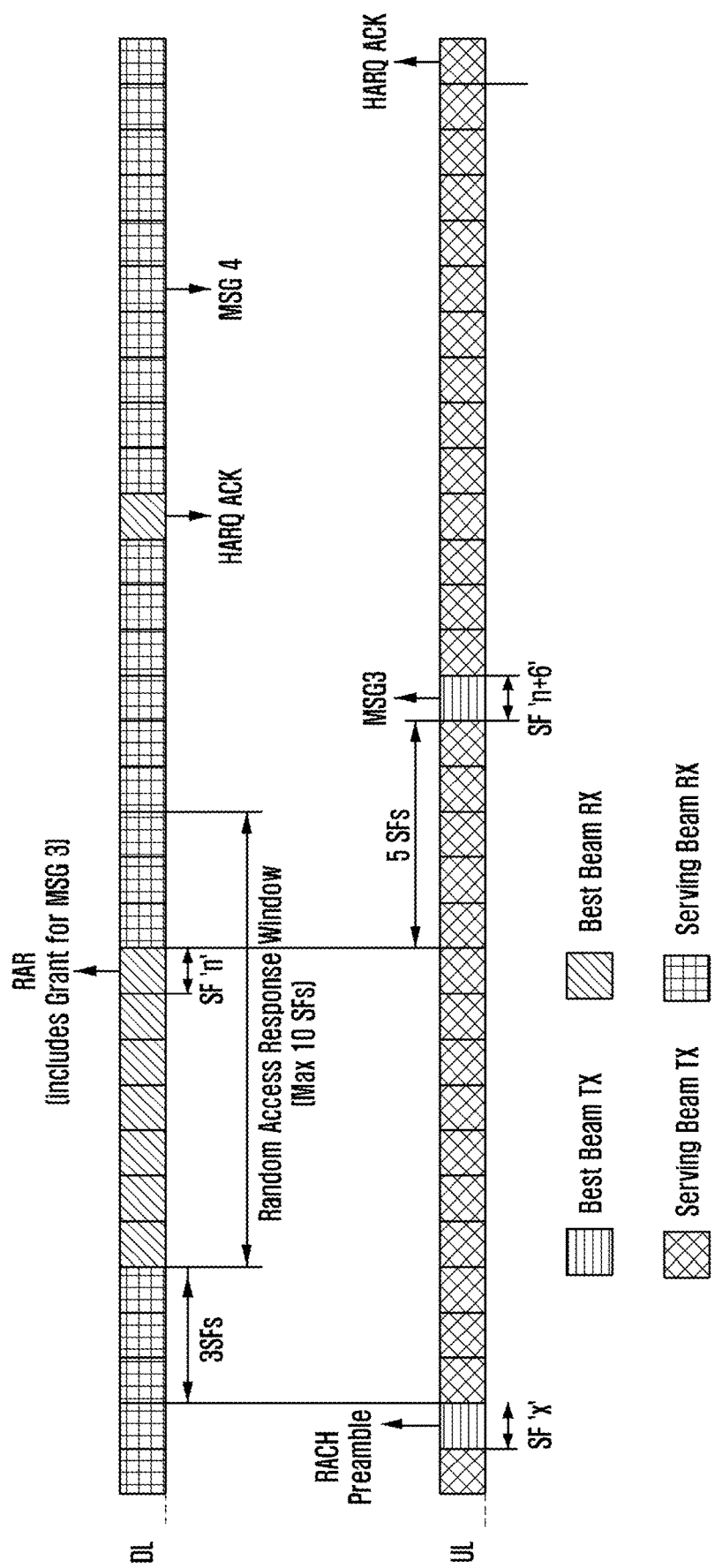
FIG. 10 illustrates beam usage during a random access procedure according to an embodiment of the present disclosure.

FIG. 10 illustrates beam usage during a random access procedure according to an embodiment of the present disclosure.

Referring to FIG. 10, in alternate method of proposed disclosure the modified beam usage during a random access procedure for beam feedback is illustrated in FIG. 10. After receiving MSG3 eNB knows the UE and its serving beam. If serving beam is good and included in MSG3, it can transmit using serving beam and UE can receive using serving beam. Best/suitable TX beam is used in SF (or time slot) where RACH Preamble, MSG3 are transmitted. Best/suitable RX beam is used from start of RAR window until UE receives RAR. Best/suitable RX beam is used in SF(s) (or time slots) where HARQ feedbacks for MSG3 are received or likely to be received. In other SFs (or time slots) UE uses serving TX/RX beam.

RACH resources may be frequency multiplexed with PUSCH resource

In this case UE should select PRACH subframe in which PUSCH is not already scheduled MSG3 and PUSCH may be scheduled in same subframe Since UE has one TX beam it has to select whether to transmit MSG3 or PUSCH UE prioritizes MSG3 transmission over PUSCH Prioritization rule is needed in subframes where UE is receiving DL information (e.g., RAR, MSG4, or HARQ ack for MSG3) related to RACH Prioritization between DL information related to RACH and other dedicated DL information (e.g., DL data or ack for UL data)

UE prioritizes RACH related DL information

Prioritization rule is needed in subframes where UE is transmitting UL information (MSG3, HARQ ack for MSG4) related to RACH Prioritization between UL information related to RACH and other dedicated UL information (e.g., UL data or ack for DL data)

UE prioritizes RACH related UL information transmission

Figure 11:
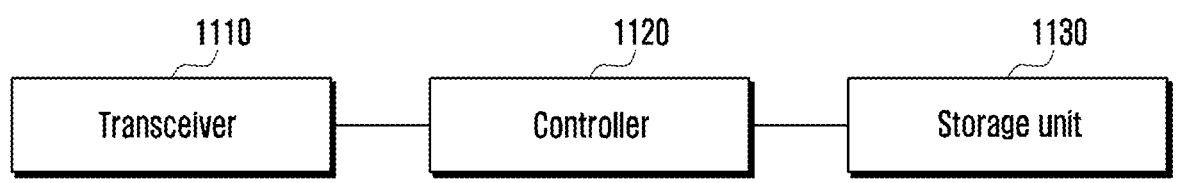
FIG. 11 illustrates a structure of a UE according to an embodiment of the present disclosure.

FIG. 11 illustrates a structure of a UE according to an embodiment of the present disclosure Referring to FIG. 11, the UE may include a transceiver (or transmission/reception unit 1110, a controller 1120, and a storage unit 1130. In the present disclosure, controller 1120 may be defined as a circuit or an application specific integrated circuit or at least one processor.

Transceiver 1110 may transmit and receive signals with other network entities. Transceiver 1110 may receive system information from, for example, a base station and may receive a synchronization signal or a reference signal.

Controller 1120 may control the overall operation of the UE according to the embodiment of the present disclosure. For example, Controller 1120 may control the signal flow between each block to perform the operation according to the flowcharts described above. In detail, controller 1120 may control operations proposed by the present disclosure to support flexible UE bandwidth during a random access procedure.

Controller 1120 is coupled with transceiver 1110 and controller 1120 is configured to transmit, to a base station, random access preamble over a first bandwidth selected among a plurality of channel bandwidths of the UE, to receive, from the base station, random access response over a second bandwidth selected among the plurality of channel bandwidths of the UE in response to the random access preamble, and to transmit, to the base station, a scheduled transmission message (message 3) over a third bandwidth selected among the plurality of channel bandwidths of the UE.

According to an embodiment of the present disclosure, the first bandwidth is less than or equal to minimum UE TX channel bandwidth among the plurality of channel bandwidths of the UE, the second bandwidth is less than or equal to minimum UE RX channel bandwidth among the plurality of channel bandwidths of the UE, and the third bandwidth is less than or equal to the minimum UE TX channel bandwidth among the plurality of channel bandwidths of the UE.

According to an embodiment of the present disclosure, the minimum UE TX channel bandwidth is identical with the minimum UE RX channel bandwidth.

Controller 1120 is configured to monitor NR-PDCCH over bandwidth less than or equal to the minimum UE RX channel bandwidth.

According to an embodiment of the present disclosure, the location of frequency resources for monitoring the NR-PDCCH is signaled in system information. According to another embodiment of the present disclosure, the location of frequency resources for monitoring the NR-PDCCH is same as or relative to a location of frequency resources in which random access preamble is transmitted. According to the other embodiment of the present disclosure, the location of frequency resources for monitoring the NR-PDCCH is same as or relative to a location of frequency resources in which MIB or broadcast information is received.

Controller 1120 is configured to receive, from the base station, a contention resolution message over fourth bandwidth selected among the channel bandwidths of the UE, wherein the fourth bandwidth is less than or equal to minimum UE RX channel bandwidth among a plurality of channel bandwidths of the UE.

According to an embodiment of the present disclosure, the scheduled transmission message (message 3) includes information on supported RX channel bandwidth of the UE.

According to an embodiment of the present disclosure, controller 1120 is configured to receive system information including resources for random access preamble transmission corresponding to each supported UE channel bandwidth. Controller 1120 is configured to select the first bandwidth for transmitting the random access preamble according to a channel bandwidth supported by the UE.

Storage unit 1130 may store at least one of information transmitted and received through the transceiver 1110 and information generated through controller 1120.

Figure 12:
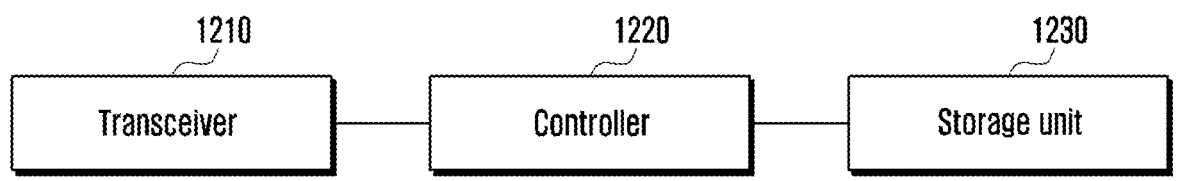
FIG. 12 illustrates a structure of a base station according to an embodiment of the present disclosure.

FIG. 12 illustrates a structure of a base station according to an embodiment of the present disclosure.

Referring to FIG. 12, the base station may include a transceiver (transmission/reception unit 1210), a controller 1220, and a storage unit 1230. In the present disclosure, controller 1220 may be defined as a circuit or an application specific integrated circuit or at least one processor.

Transceiver 1210 may transmit and receive signals with other network entities. Transceiver 1210 may transmit system information to the UE, for example, and may transmit a synchronization signal or a reference signal.

Controller 1220 may control the overall operation of the base station according to the embodiment of the present disclosure. For example, controller 1220 may control the signal flow between each block to perform the operation according to the flowcharts described above. More particularly, controller 1220 may control operations proposed by the present disclosure to support flexible UE bandwidth during a random access procedure.

Controller 1220 is coupled with transceiver 1210 and is configured to receive, from the UE, random access preamble over a first bandwidth selected among a plurality of channel bandwidths of the UE, to transmit, to the UE, random access response over a second bandwidth selected among the plurality of channel bandwidths of the UE in response to the random access preamble, and to receive, from the UE, a scheduled transmission message (message 3) over a third bandwidth selected among the plurality of channel bandwidths of the UE.

According to an embodiment of the present disclosure, the first bandwidth is less than or equal to minimum UE TX channel bandwidth among the plurality of channel bandwidths of the UE, the second bandwidth is less than or equal to minimum UE RX channel bandwidth among the plurality of channel bandwidths of the UE, and the third bandwidth is less than or equal to the minimum UE TX channel bandwidth among the plurality of channel bandwidths of the UE.

According to an embodiment of the present disclosure, the minimum UE TX channel bandwidth is identical with the minimum UE RX channel bandwidth.

According to an embodiment of the present disclosure, NR-PDCCH is monitored over bandwidth less than or equal to the minimum UE RX channel bandwidth.

According to an embodiment of the present disclosure, the location of frequency resources for monitoring the NR-PDCCH is signaled in system information. According to another embodiment of the present disclosure, the location of frequency resources for monitoring the NR-PDCCH is same as or relative to a location of frequency resources in which random access preamble is transmitted. According to another embodiment of the present disclosure, the location of frequency resources for monitoring the NR-PDCCH is same as or relative to a location of frequency resources in which MIB or broadcast information is received.

Controller 1220 is configured to transmit, to the UE, a contention resolution message over fourth bandwidth selected among the channel bandwidths of the UE, wherein the fourth bandwidth is less than or equal to minimum UE RX channel bandwidth among the plurality of channel bandwidths of the UE.

According to an embodiment, the scheduled transmission message (message 3) includes information on supported RX channel bandwidth of the UE.

According to an embodiment, controller 1220 is configured to transmit system information including resources for random access preamble transmission corresponding to each supported UE channel bandwidth. The first bandwidth for transmitting the random access preamble is selected according to a channel bandwidth supported by the UE.

The storage unit 1230 may store at least one of information transmitted/received through transceiver 1210 and information generated through the controller 1220.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   transmitting, to a base station, a random access preamble;
   receiving, from the base station, a first physical downlink control channel (PDCCH) associated with a random access response (RAR);
   receiving, from the base station, the RAR on a physical downlink shared channel (PDSCH) based on the first PDCCH;
   transmitting, to the base station, a physical uplink shared channel (PUSCH) scheduled by an uplink grant of the RAR; and
   receiving, from the base station, second PDCCH associated with a contention resolution message,
   wherein a bandwidth of the first PDCCH for RAR and a bandwidth of the second PDCCH for the contention resolution message is less than or equal to a reception channel bandwidth of the terminal, and
wherein the reception channel bandwidth of the terminal is less than a carrier bandwidth of a serving cell of the base station.

2. The method of claim 1, further comprising:
receiving, from the base station, a system information block (SIB),
wherein the SIB incudes first information on a first bandwidth part for the first PDCCH, second information on a second bandwidth part for the PUSCH.

3. The method of claim 2,
wherein the SIB further includes third information on a frequency resource for the second PDCCH, and
wherein the second PDCCH is monitored based on the frequency resource indicated by the third information.

4. The method of claim 2,
wherein the SIB further includes fourth information on a time resource for the first PDCCH for the RAR, and
wherein the first PDCCH is monitored based on the time resource and the first bandwidth part.

5. The method of claim 2,
wherein the carrier bandwidth of the serving cell of the base station is divided into a plurality of bandwidth parts, and
wherein the SIB indicates the first bandwidth part and the second bandwidth part among the plurality of bandwidth parts, respectively.

6. The method of claim 5,
wherein a bandwidth of a physical random access channel (PRACH), to which the random access preamble is transmitted, is less than a transmission channel bandwidth of the terminal, and
wherein the transmission channel bandwidth of the terminal is less than the carrier bandwidth of the serving cell of the base station.

7. The method of claim 1, further comprising:
receiving, from the base station, a master information block (MIB) on a broadcast channel (BCH), the MIB including information indicating an offset from a frequency resource for the first PDCCH to a frequency resource in which the BCH is received; and
identifying the offset based on the MIB,
wherein the first PDCCH is received on the frequency resource identified based on the offset.

8. The method of claim 1, further comprising:
in response to receiving the second PDCCH associated with the contention resolution message, transmitting hybrid automatic repeat request (HARQ) feedback, in case the contention resolution message is successfully decoded,
wherein the second PDCCH associated with the contention resolution message is received based on a temporary cell radio network temporary identifier (TC-RNTI), and
wherein the HARQ feedback is transmitted based on a C-RNTI.

9. A method performed by a base station in a wireless communication system, the method comprising:
receiving, from a terminal, a random access preamble;
transmitting, to the terminal, a first physical downlink control channel (PDCCH) associated with a random access response (RAR);
transmitting, to the terminal, the RAR on a physical downlink shared channel (PDSCH) based on the first PDCCH;
receiving, from the terminal, a physical uplink shared channel (PUSCH) scheduled by an uplink grant of the RAR; and
transmitting, to the terminal, second PDCCH associated with a contention resolution message,
wherein a bandwidth of the first PDCCH for RAR and a bandwidth of the second PDCCH for the contention resolution message is less than or equal to a reception channel bandwidth of the terminal, and
wherein the reception channel bandwidth of the terminal is less than a carrier bandwidth of a serving cell of the base station.

10. The method of claim 9, further comprising:
transmitting, to the terminal, a system information block (SIB),
wherein the SIB incudes first information on a first bandwidth part for the first PDCCH, second information on a second bandwidth part for the PUSCH.

11. The method of claim 10,
wherein the SIB further includes third information on a frequency resource for the second PDCCH and fourth information on a time resource for the first PDCCH for the RAR,
wherein the first PDCCH is transmitted based on the time resource and the first bandwidth part, and
wherein the second PDCCH is transmitted based on the frequency resource indicated by the third information.

12. The method of claim 10,
wherein the carrier bandwidth of the serving cell of the base station is divided into a plurality of bandwidth parts, and
wherein the SIB indicates the first bandwidth part and the second bandwidth part among the plurality of bandwidth parts, respectively.

13. The method of claim 12,
wherein a bandwidth of a physical random access channel (PRACH), to which the random access preamble is received, is less than a transmission channel bandwidth of the terminal, and
wherein the transmission channel bandwidth of the terminal is less than the carrier bandwidth of the serving cell of the base station.

14. The method of claim 9, further comprising:
transmitting, to the terminal, a master information block (MIB) on a broadcast channel (BCH), the MIB including information indicating an offset from a frequency resource for the first PDCCH to a frequency resource in which the BCH is received,
wherein the first PDCCH is transmitted on the frequency resource identified based on the offset.

15. A terminal in a wireless communication system, the terminal comprising:
a transceiver configured to transmit or receive a signal; and
at least one processor coupled with the transceiver and configured to:
transmit, to a base station, a random access preamble,
receive, from the base station, a first physical downlink control channel (PDCCH) associated with a random access response (RAR),
receive, from the base station, the RAR on a physical downlink shared channel (PDSCH) based on the first PDCCH,
transmit, to the base station, a physical uplink shared channel (PUSCH) scheduled by an uplink grant of the RAR, and receive, from the base station, second PDCCH associated with a contention resolution message, wherein a bandwidth of the first PDCCH for RAR and a bandwidth of the second PDCCH for the contention resolution message is less than or equal to a reception channel bandwidth of the terminal, and wherein the reception channel bandwidth of the terminal is less than a carrier bandwidth of a serving cell of the base station.

16. The terminal of claim 15, wherein the at least one processor is further configured to receive, from the base station, a system information block (SIB), and wherein the SIB incudes first information on a first bandwidth part for the first PDCCH, second information on a second bandwidth part for the PUSCH.

17. The terminal of claim 16, wherein a bandwidth of a physical random access channel (PRACH), to which the random access preamble is transmitted, is less than a transmission channel bandwidth of the terminal, and wherein the transmission channel bandwidth of the terminal is less than the carrier bandwidth of the serving cell of the base station.

18. The terminal of claim 15, wherein the at least one processor is further configured to:

receive, from the base station, a master information block (MIB) on a broadcast channel (BCH), the MIB including information indicating an offset from a frequency resource for the first PDCCH to a frequency resource in which the BCH is received, and identify the offset based on the MIB, and wherein the first PDCCH is received on the frequency resource determined based on the offset.

19. A base station in a wireless communication system, the base station comprising:

a transceiver configured to transmit or receive a signal; and at least one processor coupled with the transceiver and configured to:

receive, from a terminal, a random access preamble, transmit, to the terminal, a first physical downlink control channel (PDCCH) associated with a random access response (RAR), transmit, to the terminal, the RAR on a physical downlink shared channel (PDSCH) based on the first PDCCH, receive, from the terminal, a physical uplink shared channel (PUSCH) scheduled by an uplink grant of the RAR, and transmit, to the terminal, second PDCCH associated with a contention resolution message, wherein a bandwidth of the first PDCCH for RAR and a bandwidth of the second PDCCH for the contention resolution message is less than or equal to a reception channel bandwidth of the terminal, and wherein the reception channel bandwidth of the terminal is less than a carrier bandwidth of a serving cell of the base station.

20. The base station of claim 19, wherein the at least one processor is further configured to transmit, to the terminal, a master information block (MIB) on a broadcast channel (BCH), the MIB including information indicating an offset from a frequency resource for the first PDCCH to a frequency resource in which the BCH is received, and wherein the first PDCCH is transmitted on the frequency resource identified based on the offset.

* * * * *